US012762649B2

(12) United States Patent
Deschaintre et al.

(10) Patent No.: US 12,762,649 B2
(45) Date of Patent: Oct. 13, 2026

(54) REFERENCE IMAGE BASED MATERIAL RETRIEVAL

(71) Applicant: Adobe Inc., San Jose, CA (US)

(72) Inventors: Valentin Mathieu Deschaintre, London (GB); Rosalie Noémie Raphaëlle Martin, Mâcon (FR)

(73) Assignee: Adobe Inc., San Jose, CA (US)

( * ) Notice: Subject to any disclaimer, the term of this patent is extended or adjusted under 35 U.S.C. 154(b) by 291 days.

(21) Appl. No.: 18/589,075

(22) Filed: Feb. 27, 2024

(65) Prior Publication Data

US 2025/0272791 A1 Aug. 28, 2025

(51) Int. Cl.
*G06T 5/40* (2006.01)
*G06T 7/90* (2017.01)
(Continued)

(52) U.S. Cl.
CPC .................. *G06T 5/40* (2013.01); *G06T 7/90* (2017.01); *G06T 17/00* (2013.01); *G06V 10/56* (2022.01);
(Continued)

(58) Field of Classification Search
CPC .. G06T 5/40; G06T 7/90; G06T 17/00; G06T 2207/10024; G06V 10/56; G06V 10/60; G06V 10/761
See application file for complete search history.

(56) References Cited

U.S. PATENT DOCUMENTS 5,461,712 A 10/1995 Chelstowski et al.
5,933,823 A 8/1999 Cullen et al.
(Continued)

FOREIGN PATENT DOCUMENTS

CN 102110235 A * 6/2011 ......... G06F 16/9554
CN 103810503 A * 5/2014
(Continued)

OTHER PUBLICATIONS

Deschaintre, Valentin , et al., "Pursuant to MPEP § 2001.06(b) the applicant brings the following co-pending application to the Examiner's attention:", U.S. Appl. No. 18/242,764, filed Sep. 6, 2023, 37 pages.
(Continued)

*Primary Examiner* — Amandeep Saini
*Assistant Examiner* — Andrew S Budisalich
(74) *Attorney, Agent, or Firm* — FIG. 1 Patents

(57) ABSTRACT

Techniques for reference image based material retrieval are described that support identification of procedural materials based on visual features of input images. A processing device, for instance, receives an input image that has a particular visual appearance. The processing device generates a histogram representation of the input image that represents a color prominence of the input image and generates a color distribution based on the color prominence. The processing device leverages a vision language model to filter candidate procedural materials by a semantic similarity to the input image. The processing device then identifies a procedural material that has a visual similarity to the particular visual appearance by comparing the color distribution for the input image to color distributions associated with the filtered candidate procedural materials. In this way, the techniques described herein support efficient retrieval of procedural materials based on color and on semantic features of the input image.

20 Claims, 10 Drawing Sheets
(6 of 10 Drawing Sheet(s) Filed in Color)

(51) Int. Cl.
*G06T 17/00* (2006.01)
*G06V 10/56* (2022.01)
*G06V 10/60* (2022.01)
*G06V 10/74* (2022.01)

(52) U.S. Cl.
CPC ............ *G06V 10/60* (2022.01); *G06V 10/761* (2022.01); *G06T 2207/10024* (2013.01)

(56) References Cited

U.S. PATENT DOCUMENTS

| | | | |
|---|---|---|---|
| 6,035,055 A | | 3/2000 | Wang et al. |
| 6,411,953 B1 | | 6/2002 | Ganapathy et al. |
| 6,631,364 B1 | | 10/2003 | Rioux et al. |
| 2002/0133489 A1 | | 9/2002 | Kim et al. |
| 2003/0109940 A1 | | 6/2003 | Guntzer et al. |
| 2011/0085697 A1 | * | 4/2011 | Clippard .............. G06V 10/758 382/100 |
| 2011/0153653 A1 | | 6/2011 | King et al. |
| 2011/0274314 A1 | * | 11/2011 | Yang ....................... G06T 7/194 382/103 |
| 2012/0239638 A1 | | 9/2012 | Bennett et al. |
| 2013/0121548 A1 | * | 5/2013 | Kovalan ................. G06T 15/08 382/128 |
| 2013/0121584 A1 | * | 5/2013 | Bourdev .............. G06V 40/171 382/218 |
| 2013/0148882 A1 | * | 6/2013 | Lee ...................... G06V 10/255 382/164 |
| 2015/0039583 A1 | | 2/2015 | Liu et al. |
| 2017/0024925 A1 | | 1/2017 | Palmer et al. |
| 2017/0097948 A1 | | 4/2017 | Kerr et al. |
| 2020/0019807 A1 | | 1/2020 | Ma et al. |
| 2020/0104633 A1 | * | 4/2020 | Zheng ................ G06Q 30/0643 |
| 2020/0226773 A1 | | 7/2020 | Gan et al. |
| 2020/0321026 A1 | | 10/2020 | Tian et al. |
| 2020/0380403 A1 | | 12/2020 | Aggarwal et al. |
| 2021/0073270 A1 | * | 3/2021 | Motiian ............... G06V 10/758 |
| 2021/0343051 A1 | * | 11/2021 | Hasan .................... G06N 3/084 |
| 2022/0270313 A1 | * | 8/2022 | Su ........................... G06T 11/60 |
| 2025/0182369 A1 | * | 6/2025 | El Bakry .................. G06T 5/40 |

FOREIGN PATENT DOCUMENTS

| | | | | |
|---|---|---|---|---|
| CN | 111539883 A | * | 8/2020 | ............. G06N 3/045 |
| CN | 116320607 A | * | 6/2023 | ....... H04N 21/44016 |

OTHER PUBLICATIONS

"Non-Final Office Action", U.S. Appl. No. 18/242,764, Sep. 3, 2025, 18 pages.

* cited by examiner

REFERENCE IMAGE BASED MATERIAL RETRIEVAL

BACKGROUND

Procedurally generated materials, e.g., digital materials that are defined algorithmically rather than drawn by an artist, are often used for digital content design to create realistic environments or scenes in a digital context. Procedurally generated materials have a number of advantages including tileability, resolution independence, and editability. Accordingly, procedurally generated materials have a wide range of applications such as in video games, animation, virtual reality, augmented reality, etc.

However, techniques to author procedurally generated materials involve a user interactively and manually adjusting various features of the procedural material until the user is satisfied with the result. These techniques enable a high degree of user control, however are time consuming, inefficient, and limited by the user's experience. Alternatively, a user is able to manually browse for an existing procedurally generated material that suits the user's needs, however this is also time-consuming which negates creative capabilities.

SUMMARY

Techniques for reference image based material retrieval are described that support identification of procedural materials based on visual features of input images. In an example, a processing device receives an input image that has a particular visual appearance. The processing device generates a histogram representation of the input image that represents a color prominence of pixels of the input image. The processing device further generates a color distribution for the input image based on the color prominence. The processing device then identifies a procedural material that has a visual similarity to the particular visual appearance by comparing the color distribution for the input image to color distributions associated with procedural materials. In various implementations, the processing device leverages a vision language model to filter procedural materials by semantic similarity to the input image before comparing the color distributions. In this way, the techniques described herein support efficient retrieval of procedural materials based on various visual aspects of input images.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRA WINGS

The patent or application file contains at least one drawing executed in color. Copies of this patent or patent application publication with color drawing(s) will be provided by the Office upon request and payment of the necessary fee.

The detailed description is described with reference to the accompanying figures. Entities represented in the figures are indicative of one or more entities and thus reference is made interchangeably to single or plural forms of the entities in the discussion.

Figure 4:
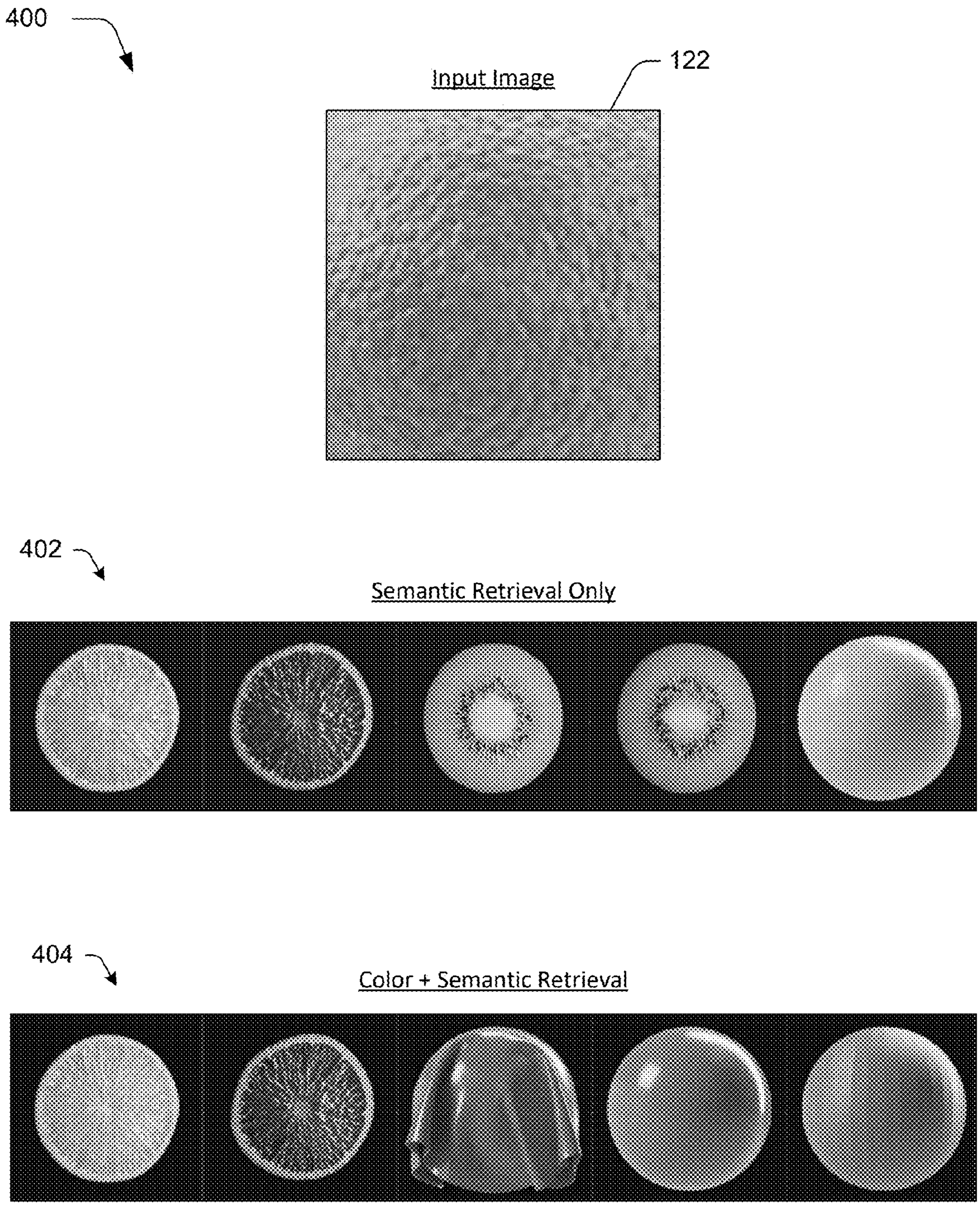

FIG. 4 which depicts an example of a comparison of procedural material retrieval.

Figure 5A:
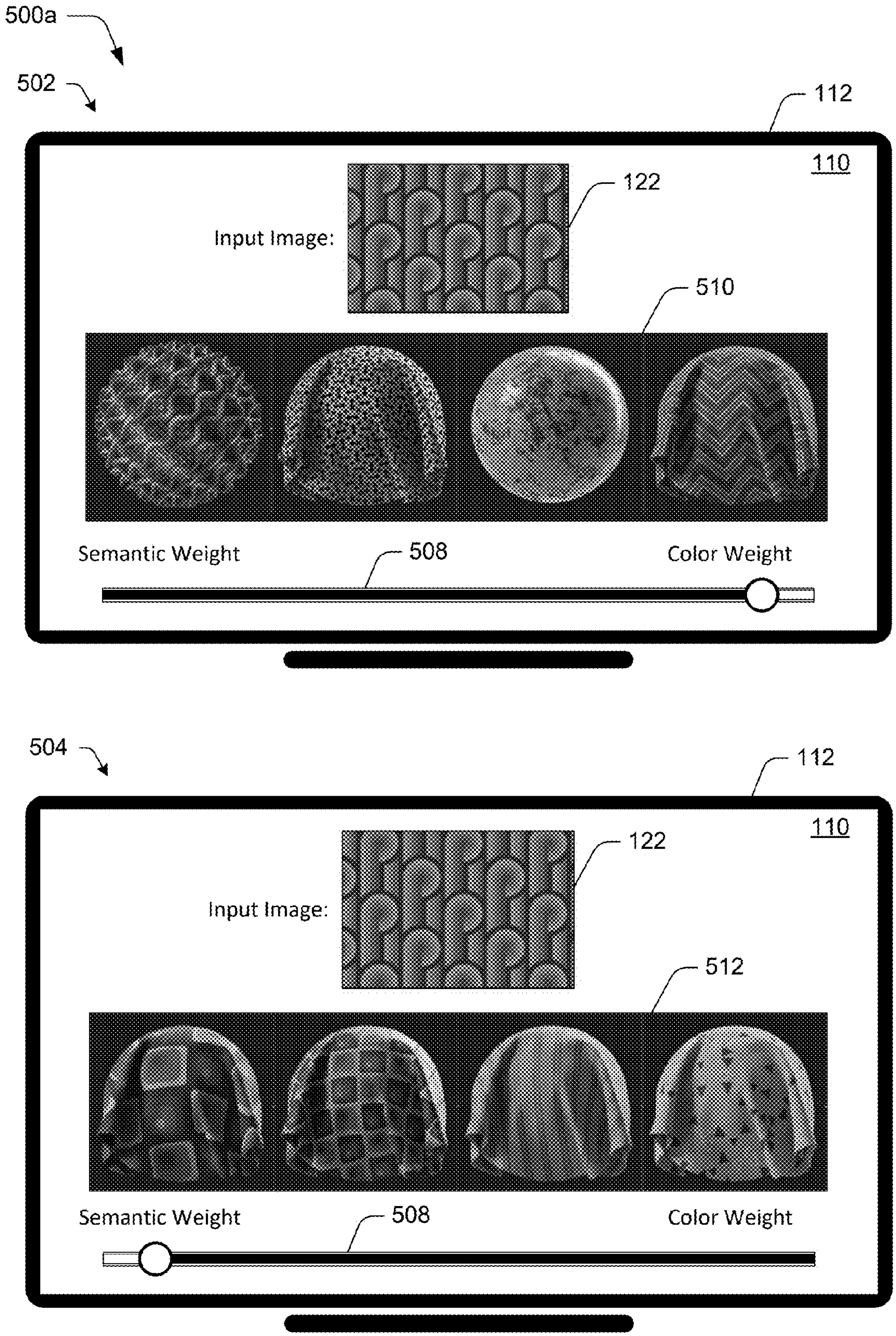
Figure 5B:
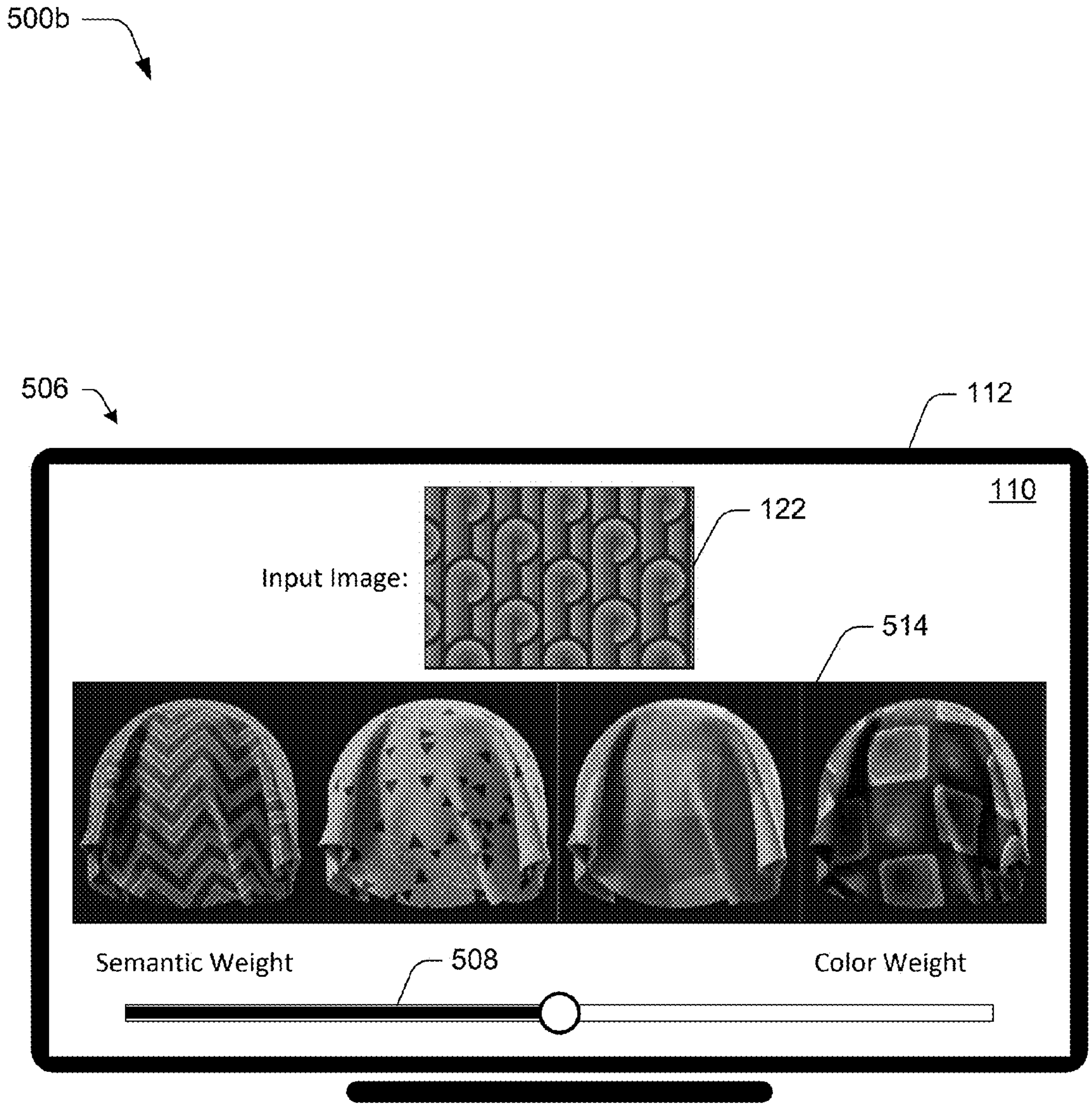

FIGS. 5*a* and 5*b* depict examples of variable influence of color on procedural material retrieval.

Figure 6:
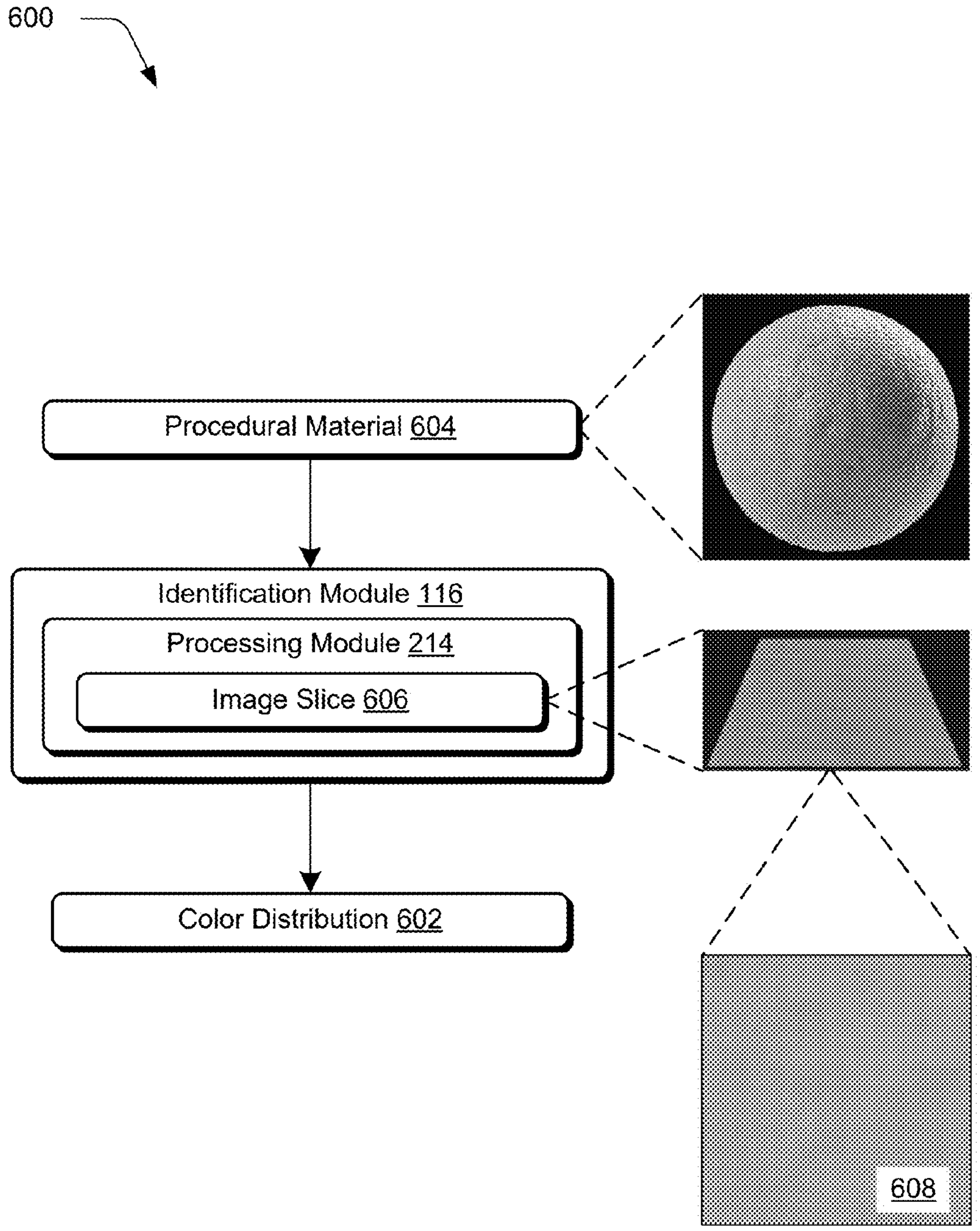

FIG. 6 depicts an example of generation of a color distribution for an example procedural material.

Figure 7:
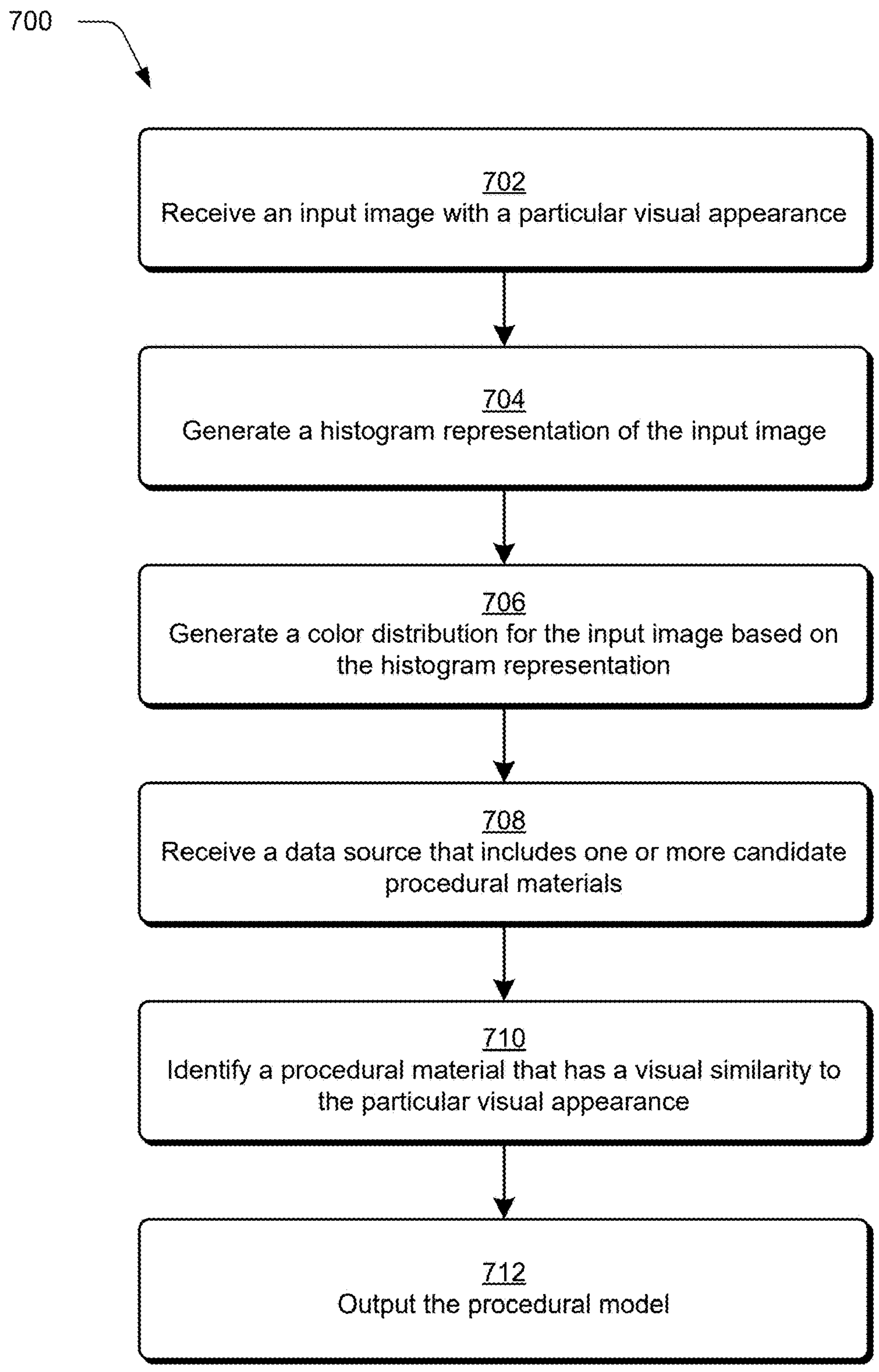

FIG. 7 is a flow diagram depicting an algorithm as a step-by-step procedure in an example implementation that is performable by a processing device to identify a procedural material.

Figure 8:
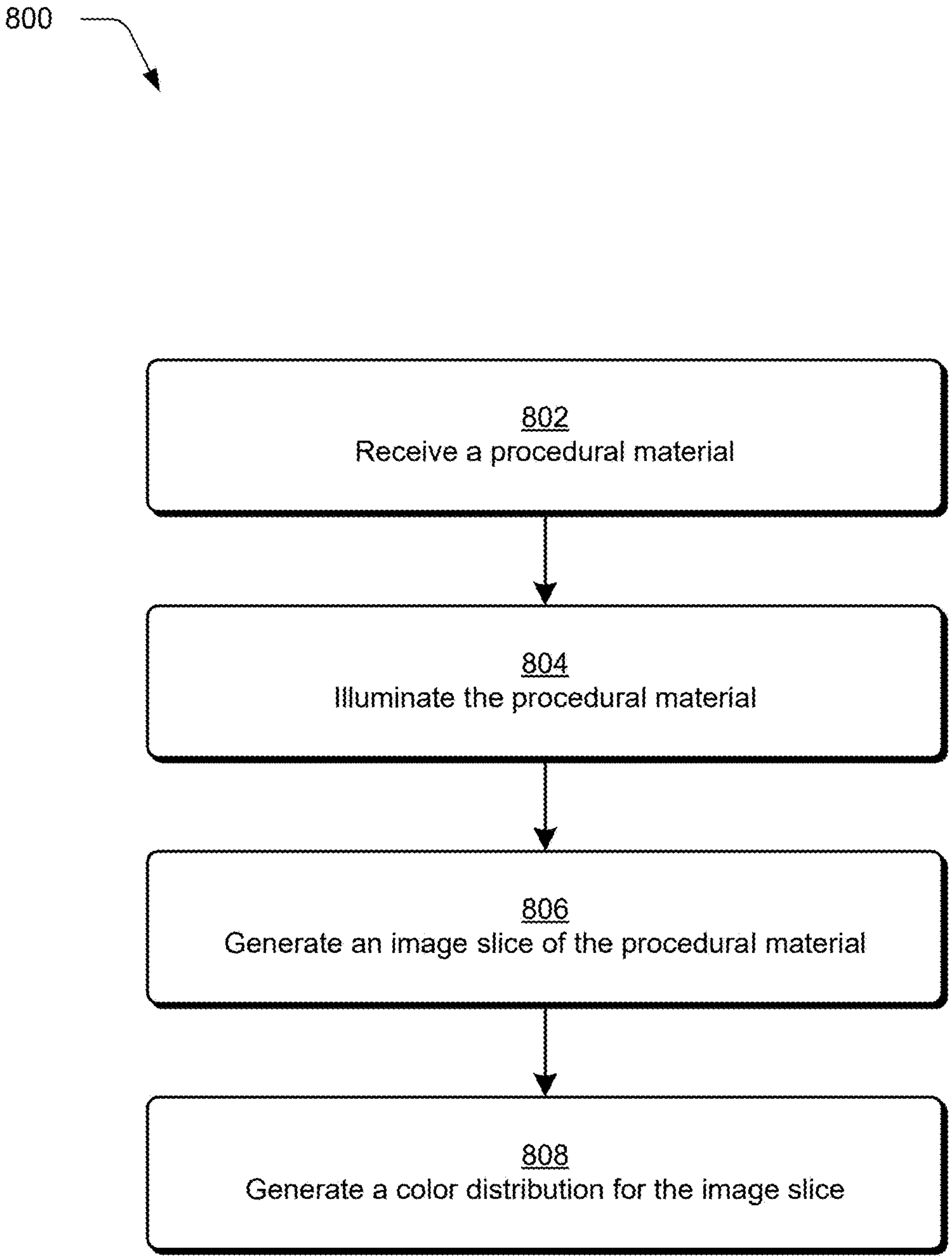

FIG. 8 depicts a flow diagram depicting an algorithm as a step-by-step procedure in an example implementation that is performable by a processing device to generate a color distribution for a procedural material.

Figure 9:
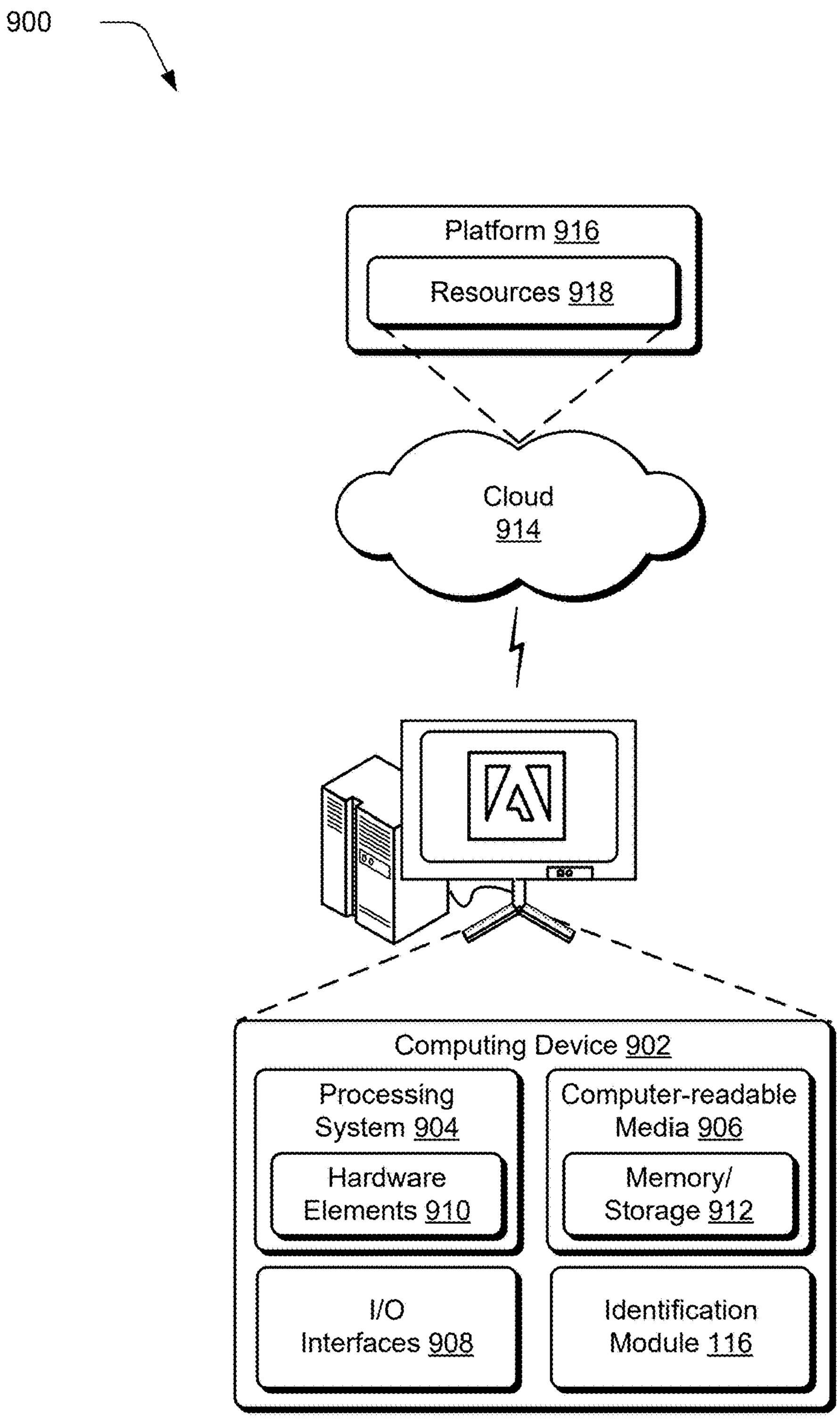

FIG. 9 illustrates an example system including various components of an example device that can be implemented as any type of computing device as described and/or utilized with reference to FIGS. 1-8 to implement embodiments of the techniques described herein.

DETAILED DESCRIPTION

Overview

Content processing systems often use procedurally generated materials to impart a unique style and customizations to objects or scenes included as part of digital content. For instance, procedurally generated materials are leveraged to create a variety of digital material appearances, and thus support complex editing and digital design operations. In some instances, it is desirable to replicate visual properties from "inspiration" digital content to a procedurally generated material. However, manually authoring new procedurally generated materials is time-consuming, computationally inefficient, and limited by a user's experience.

As an alternative to authoring a new procedurally generated material, a user is able to search for an existing procedurally generated material that suits the user's needs. However, this approach is time-consuming and the user is often unable to retrieve a procedural material that matches the inspiration digital content. Some conventional approaches leverage machine learning techniques to search for procedurally generated materials based on a user query, however these techniques sacrifice color-matching in favor of alternative image features and return inaccurate search results.

Accordingly, techniques and systems for reference image based material retrieval are described that overcome these limitations to identify procedurally generated materials (e.g., "procedural materials") that are visually similar to reference digital content. In this way, the techniques described herein enable efficient retrieval of procedural materials based on color and/or semantic features of an input image. This overcomes limitations of conventional techniques, which are limited to manually authoring a desired material or inaccurate search techniques.

Consider an example in which a user designs a digital scene in a three-dimensional modeling application. The digital scene depicts an outdoor landscape, and the user desires to apply a digital texture to a path depicted within the scene. In particular, the user wishes to make the path in the digital scene have a yellow brick-like appearance to resemble a particular digital image that the user had obtained. Using conventional approaches, the user would be forced to either manually author a procedural material to obtain the desired visual appearance or manually browse through thousands of existing procedural materials which is time consuming and computationally inefficient. Conventional machine learning approaches fail to provide explicit consideration for color, and thus return materials that are "off-target," e.g., that have a different color than the digital image.

To overcome these limitations, a processing device implements a content processing system to identify, retrieve, and/or output procedural materials that are based on visual properties of reference digital content, e.g., an input image. Continuing with the above example, the content processing system receives an input image with a particular visual appearance. In this example, the input image is a digital image depicting a yellow brick texture that has a visual appearance defined by a color palette, objects in the image, textures, patterns, etc.

The content processing system then generates a histogram representation of the input image. Generally, the histogram representation is a multi-dimensional representation of a color prominence of pixels of the input image. In this example, the content processing system generates the histogram representation in an LAB color space. The content processing system further generates a color distribution based on the histogram representation and the color prominence. The color distribution is configured such that the color prominence of the input image can be compared to color prominences of other instances of digital content.

For instance, the content processing system receives a database that includes a plurality of candidate procedural materials, e.g., hundreds of thousands of candidate procedural materials. The candidate procedural materials depict a variety of textures and patterns. The content processing system filters the candidate procedural materials using a vision language model, such as to identify candidate procedural materials that have a visual similarity to the input image that is based on semantic features. For instance, the content processing system identifies one thousand candidate procedural models that have one or more semantic similarities to the input image such as those that depict bricks, have a similar texture, etc.

Further, each of the filtered candidate procedural materials is associated with a color distribution. Accordingly, the content processing system is operable to compare the color distribution of the input image with the color distributions of the filtered candidate procedural materials, such as by using a Wasserstein metric. In this way, the content processing system determines "how similar" the color palettes of the filtered candidate procedural materials are to the input image.

The content processing system performs an alpha blending operation to identify a procedural material from the candidate procedural materials that is visually similar to the particular visual appearance. The alpha blending, for instance, is based in part on a weight of the color relative to the semantic features. In some examples this is controlled by the user, such as via a slider in a user interface. This supports enhanced user control over procedural material retrieval which increases creative capabilities.

Continuing with the above example, the content processing system identifies and outputs a procedural material that has a similar color scheme to the input image, e.g., a yellow color scheme, as well as a semantic similarity to the input image, e.g., has a similar brick pattern and texture. Thus, the techniques described herein enable procedural material retrieval based on various visual aspects of input images in a computationally efficient manner. Further discussion of these and other examples and advantages are included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

Figure 1:
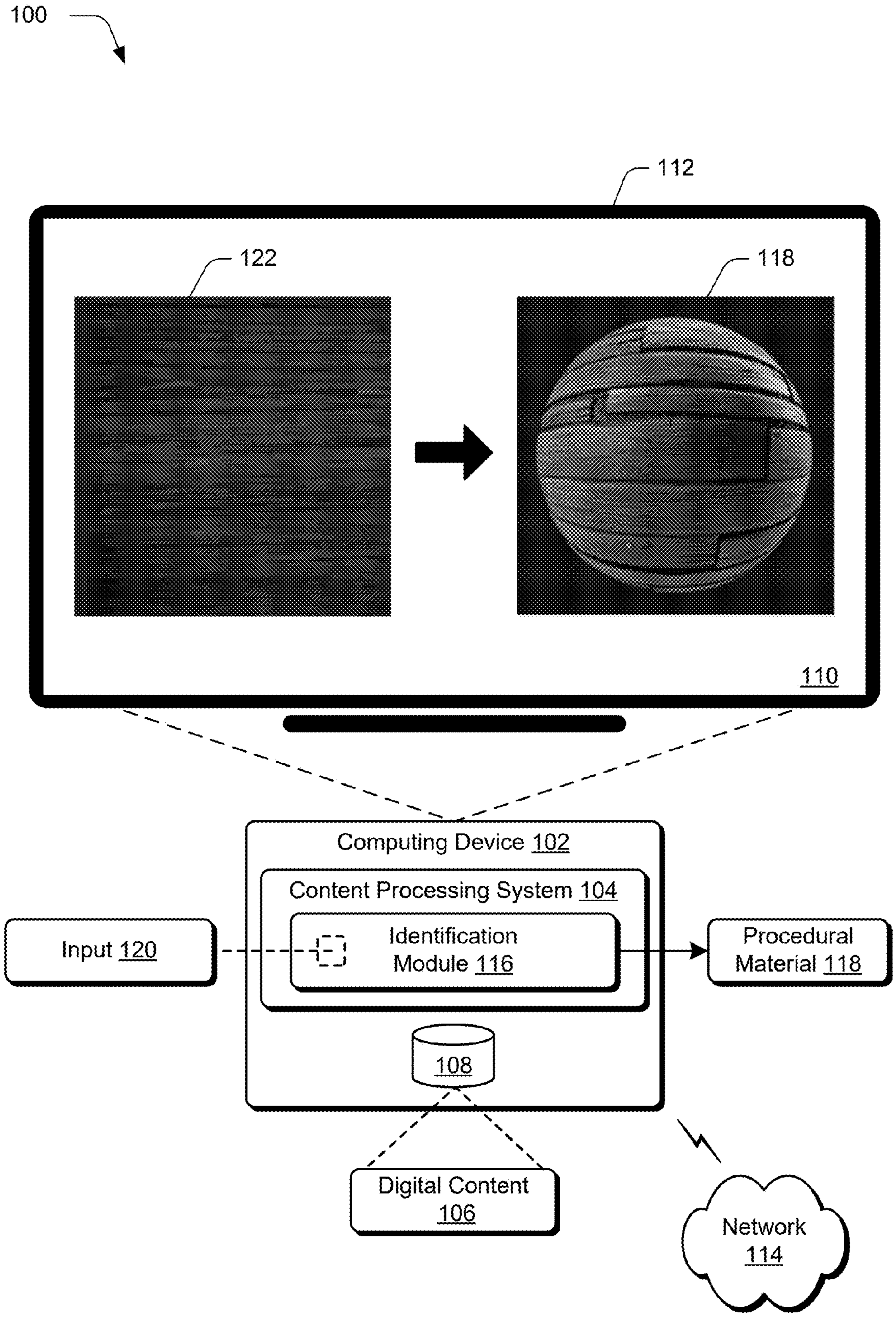
FIG. 1 is an illustration of a digital medium environment in an example implementation that is operable to employ the reference image based material retrieval techniques described herein.

FIG. 1 is an illustration of a digital medium environment 100 in an example implementation that is operable to employ the reference image-based material retrieval techniques described herein. The illustrated environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory components and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including a content processing system 104. The content processing system 104 is implemented at least partially in hardware of the computing device 102 to process digital content 106, which is illustrated as maintained in storage 108 of the computing device 102. Such processing includes creation of the digital content 106, modification of the digital content 106, and causing the digital content 106 to be rendered in a user interface 110 for output, e.g., by a display device 112. In various examples, the digital content 106 includes one or more procedurally generated materials maintained in storage 108. Although illustrated as implemented locally at the computing device 102, functionality of the content processing system 104 is also configurable in whole or in part via functionality available via the network 114, such as part of a web service or "in the cloud."

An example of functionality incorporated by the content processing system 104 to process the digital content 106 is illustrated as an identification module 116. The identification module 116 is configured to identify a procedural material 118 that has a visual similarity to one or more reference images. For instance, in the illustrated example the identification module 116 receives an input 120 that includes digital content such as an input image 122. The input image 122 is configurable in a variety of ways and/or file formats, such as a JPEG, PNG, GIF, raster image, vector image, digital video, etc. In this example, the input image 122 depicts a material having a particular visual appearance, such as an image of a dark brown wood with a black horizontal grain pattern.

A user of the computing device 102 wishes to obtain a procedural material 118 that has a visual likeness to the input image 122 such as for a design application. Using conventional approaches, the user would be forced to manually search for a procedural material and/or author a procedural material from scratch which is time consuming, challenging, and computationally demanding. To overcome these limitations, the identification module 116 is operable to identify a procedural material 118 that is visually similar to the input image 122 based on one or more colors of the input image 122 as well as one or more semantic features of the input image 122. Semantic features represent attributes and/or characteristics of the input image 122 other than a color of the input image 122. For instance, semantic features include one or more patterns, textures, image objects, behaviors, structural details, relationships between image features, emotions, contextual information, perspective, text-based attributes, etc.

In this example, the identification module 116 identifies the procedural material 118 as having a visual similarity to the input image 122. For instance, the identification module 116 selects the procedural material 118 from a plurality of procedurally generated materials that are maintained in a data source, e.g., storage 108, as having the highest resemblance to the input image 122 based on color as well as various semantic features. As illustrated, the procedural material 118 includes a similar and/or same dark brown and black color scheme as the input image 122. The procedural material 118 further includes visual similarities based on semantic features, such as the wooden texture and horizontal grain pattern. In this way, the techniques described herein overcome conventional limitations to efficiently identify procedural materials 118 based on various visual aspects of reference images, such as color and semantic features. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Reference Image Based Material Retrieval

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6 in parallel with FIG. 7 that depicts a flow diagram depicting an algorithm as a step-by-step procedure 700 in an example implementation that is performable by a processing device to identify a procedural material and FIG. 8 that depicts a flow diagram depicting an algorithm as a step-by-step procedure 800 in an example implementation that is performable by a processing device to generate a color distribution for a procedural material.

Figure 2:
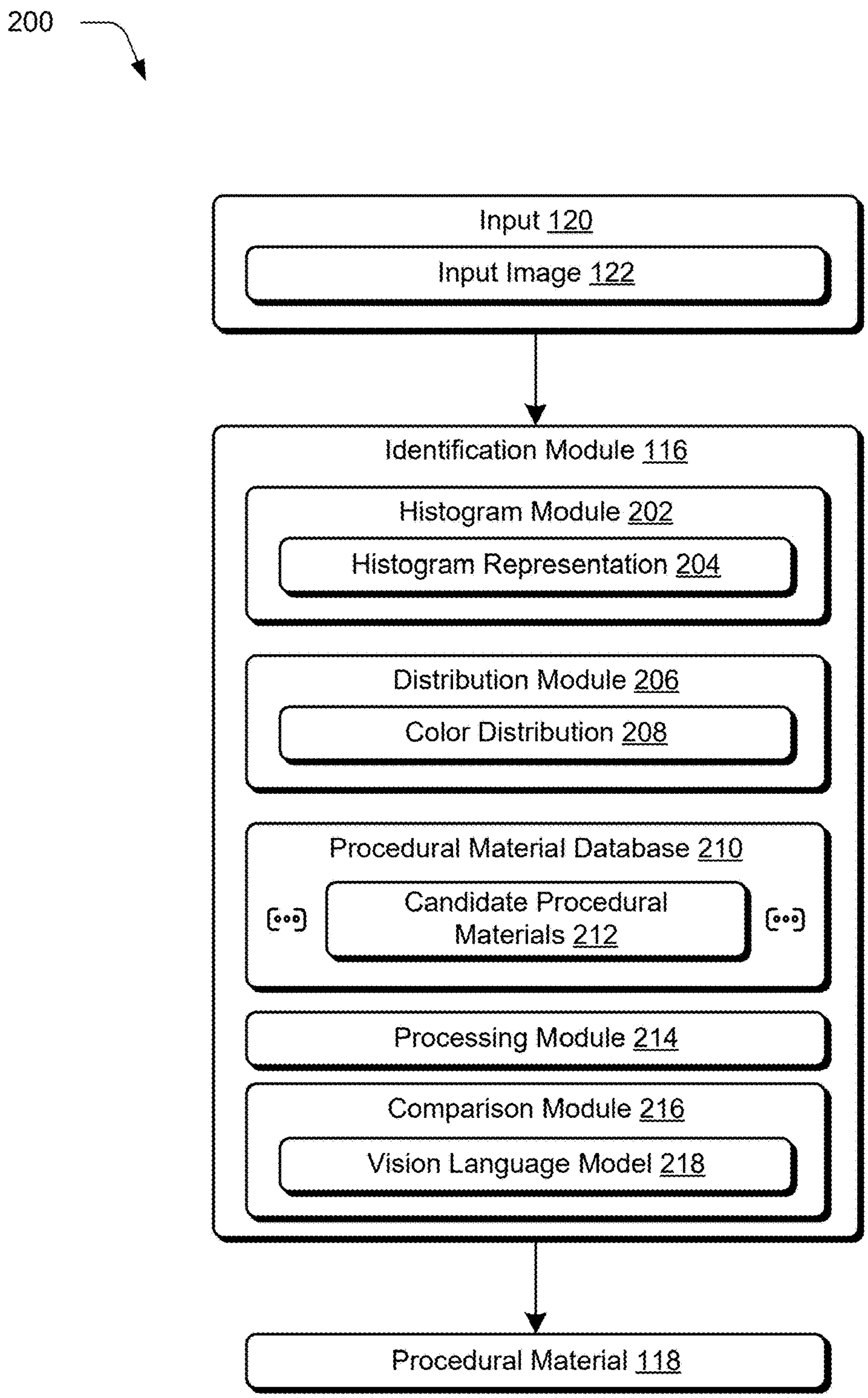
FIG. 2 depicts a system in an example implementation showing operation of an identification module in greater detail.

FIG. 2 depicts a system 200 in an example implementation showing operation of an identification module 116 in greater detail. Generally, the identification module 116 is operable to identify one or more procedural materials 118 (such as from storage 108 that includes a plurality of procedurally generated materials) that has a visual similarity to an instance of reference digital content. In various examples, the procedural material 118 that is identified is based on color features and/or semantic features of the reference digital content and/or on the procedural material 118.

In an example to do so, the identification module 116 receives an input image with a particular visual appearance (block 702). The particular visual appearance includes a variety of features of the input image 122 such as a color palette used in the image, contrast, brightness, texture, composition, saturation, resolution, style, patterns, objects, relationships, etc. This is by way of example and not limitation, and a variety of visual appearance features are considered. It should be understood that while in this example the input image 122 is described as a single image, in various examples the input image 122 is representative of a variety of digital content 106 such as multiple digital images, digital video, AR/VR content, etc.

For instance, the input image 122 is configurable in a variety of ways and/or file formats, such as a JPEG, PNG, GIF, raster image, vector image, etc. The input image 122 is able to include a variety of digital content, such as one or more photographs, drawings, paintings, graphics, illustrations, cartoons, etc. In one example, the input image 122 is captured by a user of a computing device 102, e.g., using one or more image capture devices. In an additional or alternative example, the input image 122 is obtained by the identification module 116 via the internet, such as obtained automatically and without user intervention and/or uploaded by a user. This is by way of example and not limitation, and a variety of input images 122 are considered.

The identification module 116 includes a histogram module 202 that is operable to generate a histogram representation 204 of the input image 122 (block 704). Generally, the histogram representation 204 is a multi-dimensional representation of a color prominence of pixels of the input image 122. In an example to generate the histogram representation 204, the histogram module 202 converts the input image 122 to a color space such as an LAB color space. The LAB color space includes three components, i.e., three distinct "channels." For instance, the LAB color space includes an L-component that represents luminance and/or lightness, an A-component that represents a color value on a green to red axis, and a B-component that represents a color value on a blue to yellow axis. The LAB color space is perceptually motivated and accordingly conversion of the input image 122 to the LAB color space increases the ability of the identification module 116 to discern between perceptual color differences. This is by way of example and not limitation and a variety of color spaces are considered, such as an RGB (red, green, blue) color space a CMY (cyan, magenta, yellow) color space, an HSV (hue, saturation, value), grayscale, HSL (hue, saturation, lightness) etc.

The histogram module 202 is operable to generate the histogram representation 204 with varying dimensionality and/or bins. In this example, the histogram representation 204 is three-dimensional wherein the L-component, A-component, and B-component of the LAB color space each represent a respective dimension. Thus, the histogram representation includes a luminance dimension and two color dimensions.

Each dimension of the histogram representation 204 includes one or more "bins" that define intervals into which the data (e.g., pixel data) is sorted by the histogram module 202. In one example, the dimensions that correspond to the A-component and the B-component include more bins than the dimension corresponding to the L-dimension. For instance, the dimension corresponding to the L-dimension includes eight bins, while the dimensions that correspond to the A-component and the B-component each include thirty-two bins. In this way, the histogram representation 204 is configured such that bins for color values of pixels are more discrete relative to the bins for luminance values.

The histogram module 202 then determines which bin pixels of the input image 122 fall into. For instance, a pixel of the input image 122 is represented as a triple in LAB space and the histogram module 202 assigns the pixel to a particular bin based on the triple. The histogram module 202 is operable to iterate this process for each pixel in the input image 122 to represent the color prominence of the input image 122.

The identification module 116 further includes a distribution module 206 that is operable to generate a color distribution 208 for the input image 122 based on the histogram representation 204 (block 706). Generally, the color distribution 208 is configured such that the color prominence of two or more instances of digital content 106 can be compared to one another. The distribution module 206 is operable to determine a number of pixels in each of the bins from the histogram representation 204. In this way, the distribution module 206 is able to identify the top "k" number of bins with the highest number of pixels. For instance, the distribution module 206 identifies seven bins with the most pixels. The distribution module 206 further determines an LAB value that is representative of each of the seven bins, such as an LAB value at the center of a respective bin.

Continuing with the above example, the distribution module 206 then converts the number of pixels in each of the top seven bins into a percentage that represents the number of pixels of the input image 122 that fall within the respective bin. The distribution module 206 is further operable to represent the input image 122 with a reduced number of pixels, e.g., thirty pixels, and convert the percentage back into a pixel count. In this way, the color distribution 208 represents the seven most prevalent colors in the input image and includes a relative proportion of pixels represented by the top seven colors.

The identification module 116 then receives and/or accesses a data source, e.g., a procedural material database 210, that includes one or more candidate procedural materials 212 (block 708). In an example, the procedural material database 210 is maintained in storage 108. The procedural material database 210 includes a collection of candidate procedural materials 212 that represent various digital textures, patterns, appearances, etc. The candidate procedural materials 212 are generated algorithmically and in one example are defined by a node graph that includes a sequence of parametrized nodes connected by various edges. Each of the candidate procedural materials 212 further is associated with a color distribution that defines a color prominence of the respective candidate procedural material 212. The color distributions for the candidate procedural materials 212, for instance, are in a same format as the color distribution 208 for the input image 122.

In some examples, the identification module 116 receives the procedural material database 210 with the candidate procedural materials 212 preprocessed. For instance, the candidate procedural materials 212 are each associated with a color distribution. In an additional or alternative example, the identification module 116 includes a processing module 214 that is operable to generate color distributions for the candidate procedural materials 212, such as described below with respect to FIG. 6 and FIG. 8.

The identification module 116 includes a comparison module 216 that is operable to identify a procedural material 118 that has a visual similarity to the particular visual appearance of the input image 122 (block 710). The comparison module 216 identifies the procedural material 118, for instance, based on the color prominence of the input image 122 and/or on one or more semantic features of the input image 122. The semantic features include a variety of attributes and/or characteristics of the input image 122. For instance, semantic features include one or more patterns, textures, image objects, behaviors, structural details, relationships between image features, emotions, contextual information, perspectives, text-based attributes, vision language model feature-space features, etc.

In an example to identify the procedural material 118, the comparison module 216 includes a vision language model 218. The vision language model 218, for instance, is a machine learning model that is configured to associate images with textual descriptions and understand a relationship between visual and textual data in a visual language model feature space. A variety of vision language models 218 are contemplated, such as one or more of a contrastive language-image pretraining ("CLIP") model, vision transformer ("ViT") model, universal image-text representation ("UNITER") model, etc.

The comparison module 216 leverages the vision language model 218 to filter the candidate procedural materials 212 based on a semantic similarity to the input image 122. For instance, the comparison module 216 leverages the vision language model 218 to identify semantic features of the input image 122 and identify candidate procedural materials 212 that include similar and/or same semantic features. In this way, the comparison module 216 is operable to reduce the number of candidate procedural materials 212, such as from hundreds of thousands to thousands that have a semantic similarity to the input image 122 that is over a threshold amount. Thus, the comparison module 216 reduces computational resource consumption during identification of the procedural material 118 and further ensures that the procedural material 118 is semantically similar to the input image 122.

While the vision language model 218 is adept at identifying procedural materials with a semantic similarity to the input image 122, use of the vision language model 218 alone often sacrifices color matching and thus returns procedural materials that do not resemble the input image as further described below with respect to FIG. 4. Accordingly, the comparison module 216 compares the color distribution 208 to color distributions for the filtered candidate procedural materials 212. To do so, the comparison module 216 calculates a Wasserstein distance (also known as an earth mover distance) between the color distribution 208 and the color distributions for the filtered candidate procedural materials 212. The Wasserstein distance quantifies a similarity between the respective distributions and thus defines a color-based visual similarity between the input image 122 and the filtered candidate procedural materials 212.

Based on the color-based similarity and the semantic similarity, the comparison module 216 is operable to rank the filtered candidate procedural materials 212 from most similar to least similar. The comparison module 216 is further operable to determine an amount of influence that color and/or semantic features have in identification of the procedural material 118. In various examples, the comparison module 216 performs an alpha blending operation to combine the influence of color and semantic features when identifying the procedural material 118. The alpha blending, for instance, is based in part on a weight that defines an amount of influence of the color prominence on identification of the procedural material 118. In some examples, the weight is determined automatically and without user intervention. Additionally or alternatively, the weight is based on a user input, such as a user input to manipulate a slider displayed in the user interface 110 as depicted in FIGS. 5*a* and 5*b*.

Once identified, the identification module 116 is operable to output the procedural material 118, such as for display in the user interface 110 (block 712). In this example, the identification module 116 outputs the procedural material 118 from the candidate procedural materials 212 that is the most visually similar, based on color and at least one semantic feature, to the input image 122. In additional or alternative examples, the identification module 116 identifies multiple procedural materials for display in the user interface 110, such as a top "k" number of similar procedural materials.

Figure 3:
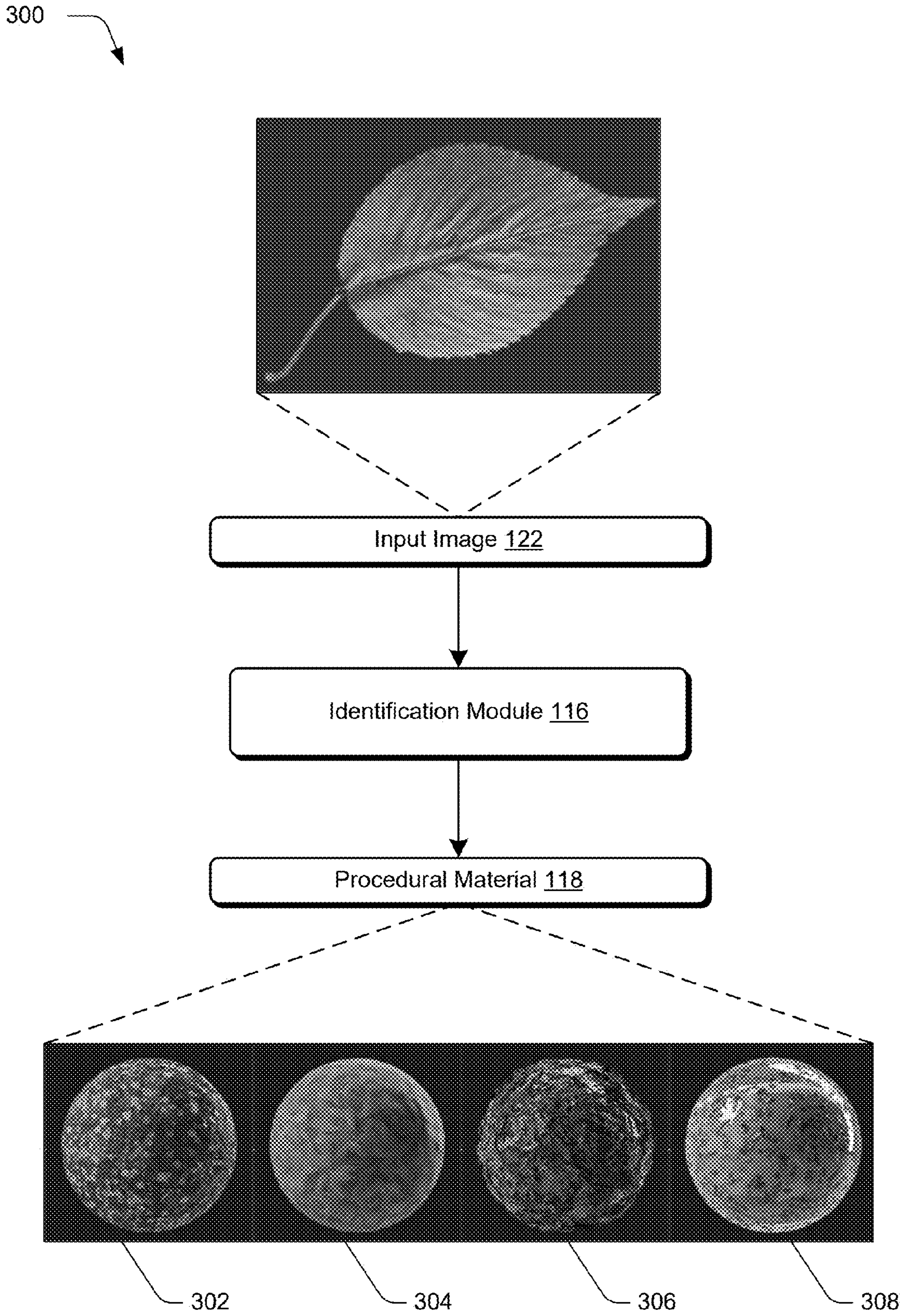
FIG. 3 depicts an example of identification of several procedural materials based on an input image.

For instance, FIG. 3 depicts an example 300 of identification of several procedural materials based on an input image 122. In this example, the input image 122 depicts a singular red-brown leaf. The input image 122 is defined by a particular visual appearance, e.g., colors, textures, patterns, etc. that depict the leaf. In accordance with the techniques described herein, the identification module 116 generates four prospective procedural materials 302, 304, 306, and 308 that have a visual similarity to the input image 122.

As shown in the illustrated example, the procedural materials 302, 304, 306, and 308 each match semantic features of the input image 122, such as a context that defines that the input image 122 depicts a leaf as well as properties of the leaf. Further, the procedural materials 302, 304, 306, and 308 include a similar color palette as the input image 122, e.g., red-brown leaves as well as subtle hues present in the input image 122. This overcomes the limitations of conventional machine learning approaches, which sacrifice color matching capabilities.

By way of example, consider FIG. 4 which depicts an example 400 of a comparison of procedural material retrieval in a first example 402 and a second example 404. In the first example 402, five procedural materials are retrieved based on a visual similarity to strictly semantic features of the input image 122, e.g., based on a texture and contextual features of the input image 122. As illustrated, the input image 122 depicts a close-up view of an orange. Accordingly, the procedural materials retrieved in the first example 402 are semantically similar to the input image 122. For instance, each of the procedural materials depict fruits, e.g., an orange, a blood orange, a kiwi, and a lemon peel texture. However, the procedural materials in the first example 402 are visually dissimilar to the input image 122 with respect to color. Thus, strictly semantic-based searching often returns inaccurate and/or incomplete results.

However, in the second example 404 the procedural materials are identified based on color and semantic features in accordance with the techniques described herein. Accordingly, the color palette of the procedural materials depicted in the second example 404 matches the color palette of the input image 122, e.g., predominantly orange hues. The procedural materials depicted in the second example 404 further share similarities based on one or more semantic features of the input image 122. Thus, the techniques described herein support efficient and accurate material retrieval and further overcome limitations of conventional techniques that do not provide explicit consideration for color-based features when retrieving procedural materials.

FIGS. 5*a* and 5*b* depict examples 500*a* and 500*b* of variable influence of color on procedural material retrieval in a first example 502, a second example 504, and a third example 506. In this example, a user interface 110 of a display device 112 includes a slider 508 that is operable to control an amount of influence of color relative to semantic features on procedural material retrieval based on an input image 122. For instance, positioning of the slider 508 to the right increases the weight of color on procedural material retrieval while positioning of the slider 508 to the left decreases the weight of color on material retrieval.

As depicted in the first example 502, the input image 122 has a particular visual appearance defined by a color scheme that has varying shades of red, orange, and black. The particular visual appearance further includes semantic features such as a pattern of the input image 122, a relationship between elements of the input image 122, etc. In the first example 502, the slider 508 is positioned toward the right and as such the identification module 116 assigns a higher weight to color, such as during alpha blending as described above. Accordingly, the identification module 116 identifies procedural materials 510 that have a visual similarity to the input image 122 largely based on color features of the input image 122. For instance, each of the procedural materials 510 includes a color palette of reds, blacks, and oranges.

As depicted in the second example 504, the slider 508 is positioned toward the left and as such the identification module 116 assigns a higher weight to semantic features and a lower weight to color. Accordingly, the identification module 116 identifies procedural materials 512 that have a visual similarity to the input image 122 largely based on semantic features of the input image 122. As illustrated, each of the procedural materials 512 includes visually similar patterns however do not have a similar color profile. For instance, some of the procedural materials include purple and dark brown hues.

As depicted in the third example 506 of FIG. 5*b*, the slider 508 is positioned in the middle and as such the identification module 116 assigns an equal weight to semantic features and color features. Accordingly, the identification module 116 identifies procedural materials 514 that have a visual similarity to the input image 122 based on semantic features as well as on color features of the input image 122. Accordingly, the techniques described herein support enhanced user control over procedural material retrieval in a computationally efficient manner, which increases creative capabilities.

FIG. 6 depicts an example 600 of generation of a color distribution 602 for an example procedural material 604. As described above, in some examples the identification module 116 includes a processing module 214 that is operable to generate color distributions for each of the candidate procedural materials 212 in the procedural material database 210. In an example to do so, the identification module 116 receives a procedural material 604 (block 802). The procedural material 604, for instance, is a candidate procedural material 212 from the procedural material database 210.

The processing module 214 then illuminates the procedural material 604 under a constant lighting condition (block 804). In this example, the processing module 214 illuminates the procedural material 604, which depicts a lemon peel material, under soft environmental lighting conditions. The processing module 214 next generates an image slice 606 of the procedural material 604 (block 806). The image slice 606 for instance, represents a two-dimensional cross-section of the procedural material 604. A planar representation of the image slice 606 is depicted at 608.

The processing module 214 is then operable to generate a color distribution 602 for the image slice 606 (block 808). The processing module 214 does so in accordance with the techniques described above with respect to generation of the color distribution 208. For instance, the processing module 214 generates a histogram representation of the image slice 606 that represents a color prominence of pixels of the image slice and generates the color distribution 602 based on the histogram representation, such as based on a color prominence of the image slice 606 as described above in greater detail. The processing module 214 is operable to iterate this process for each of the candidate procedural materials 212 included in the procedural material database 210. In this way, the identification module 116 can efficiently compare color distributions of the candidate procedural materials 212, e.g., the color distribution 602, with reference color distributions of reference digital images, e.g., the color distribution 208 of the input image 122.

Example System and Device

FIG. 9 illustrates an example system generally at 900 that includes an example computing device 902 that is representative of one or more computing systems and/or devices that implement the various techniques described herein. This is illustrated through inclusion of the identification module 116. The computing device 902 is configurable, for example, as a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

receiving, by a processing device, an input image having a particular visual appearance;

generating, by the processing device, a histogram representation of the input image that represents a color prominence of pixels of the input image;

identifying, by the processing device, a procedural material using a visual language model that has a visual similarity to the particular visual appearance of the input image based on the color prominence and at least one semantic feature of the input image; and outputting, by the processing device for display in a user interface, the procedural material.

2. The method as described in claim 1, wherein the histogram representation is three dimensional and is generated in an LAB color space.

3. The method as described in claim 2, wherein the histogram representation includes eight bins for a luminance dimension, thirty-two bins for a first color dimension, and thirty-two bins for a second color dimension.

4. The method as described in claim 1, wherein the identifying the procedural material includes filtering a plurality of candidate procedural materials based on a semantic similarity to the input image using a vision language model.

5. The method as described in claim 4, wherein the identifying the procedural material includes generating a color distribution for the input image based on the histogram representation and comparing the color distribution to color distributions associated with the plurality of candidate procedural materials using a Wasserstein distance.

6. The method as described in claim 1, wherein the identifying the procedural material is based in part on a weight to determine an amount of influence of the color prominence on identifying the procedural material.

7. The method as described in claim 6, wherein the user interface includes a slider to control the weight.

8. The method as described in claim 6, wherein the amount of influence is based in part on an alpha blending between the color prominence and the at least one semantic feature.

9. The method as described in claim 1, wherein the at least one semantic feature includes one or more of a pattern, image object, or text-based attribute of the input image.

10. A system comprising:

a memory component; and a processing device coupled to the memory component, the processing device to perform operations including:

receiving an input image having a particular visual appearance;

generating a histogram representation of the input image that represents a color prominence of pixels of the input image;

identifying a procedural material using a vision language model that has a visual similarity to the particular visual appearance of the input image based on the color prominence and at least one semantic feature of the input image, the procedural material defined algorithmically by a node graph; and outputting, for display in a user interface of the processing device, the procedural material.

11. The system as described in claim 10, wherein the histogram representation is three-dimensional, each dimension of the histogram representation corresponding to a dimension of an LAB color space.

12. The system as described in claim 10, wherein the identifying the procedural material includes filtering a plurality of candidate procedural materials based on a semantic similarity to the input image using the vision language model.

13. The system as described in claim 12, wherein the identifying the procedural material includes generating a color distribution for the input image based on the histogram representation and comparing the color distribution to color distributions associated with the plurality of candidate procedural materials using an earth mover distance.

14. The system as described in claim 10, wherein the identifying the procedural material is based in part on a weight to determine an amount of influence of the color prominence on identifying the procedural material.

15. The system as described in claim 14, wherein the amount of influence is based in part on an alpha blending between the color prominence and the at least one semantic feature.

16. The system as described in claim 10, wherein the at least one semantic feature includes one or more of a pattern, image object, or text-based attribute of the input image.

17. A non-transitory computer-readable storage medium storing executable instructions, which when executed by a processing device, cause the processing device to perform operations comprising:

receiving a data source that includes a procedural material;

generating, for the procedural material in the data source, a color distribution based on a color prominence of the procedural material;

generating a reference color distribution for a reference digital image that has a particular visual appearance; and identifying the procedural material from the data source using a vision language model as having a visual similarity to the particular visual appearance based on the color prominence and at least one semantic feature of the reference digital image.

18. The non-transitory computer-readable storage medium as described in claim 17, wherein the generating the color distribution for the procedural material includes:

illuminating the procedural material under soft environmental lighting conditions;

generating an image slice of the procedural material; and generating the color distribution based on a color prominence of the image slice.

19. The non-transitory computer-readable storage medium as described in claim 17, wherein the data source includes a plurality of procedural materials, and identifying the procedural material includes comparing color distributions for the plurality of procedural materials with the reference color distribution.

20. The non-transitory computer-readable storage medium as described in claim 19, wherein the comparing includes filtering the plurality of procedural materials based on a semantic similarity to the reference digital image using a vision language model.

* * * * *